United States Patent
Takazane

(10) Patent No.: US 9,337,604 B2
(45) Date of Patent: May 10, 2016

(54) CARBON DIOXIDE GAS LASER OSCILLATOR WHICH CAN ESTIMATE COMPOSITION RATIO OF LASER GAS

(71) Applicant: FANUC CORPORATION, Minamitsuru-gun, Yamanashi (JP)

(72) Inventor: Tetsuhisa Takazane, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/676,290

(22) Filed: Apr. 1, 2015

(65) Prior Publication Data

US 2015/0288128 A1 Oct. 8, 2015

(30) Foreign Application Priority Data

Apr. 3, 2014 (JP) ................................. 2014-077303

(51) Int. Cl.
*H01S 3/036* (2006.01)
*H01S 3/04* (2006.01)
*H01S 3/041* (2006.01)
*H01S 3/097* (2006.01)
*H01S 3/223* (2006.01)

(52) U.S. Cl.
CPC ................ *H01S 3/036* (2013.01); *H01S 3/041* (2013.01); *H01S 3/0407* (2013.01); *H01S 3/097* (2013.01); *H01S 3/2232* (2013.01)

(58) Field of Classification Search
CPC ....... H01S 3/036; H01S 3/0407; H01S 3/041; H01S 3/097; H01S 3/2232
See application file for complete search history.

(56) References Cited

U.S. PATENT DOCUMENTS

| 4,360,923 | A | * | 11/1982 | Thayer et al. ................... 372/89 |
| 5,642,374 | A | * | 6/1997 | Wakabayashi et al. ......... 372/57 |
| 6,130,904 | A | * | 10/2000 | Ishihara et al. ................. 372/59 |
| 7,551,661 | B2 | | 6/2009 | Egawa |
| 2007/0177649 | A1 | * | 8/2007 | Kubo et al. ..................... 372/58 |
| 2012/0236885 | A1 | * | 9/2012 | Watanabe et al. ............... 372/31 |

FOREIGN PATENT DOCUMENTS

| JP | 6425585 | | 1/1989 |
| JP | 06244478 | | 9/1994 |
| JP | H 06244478 | * | 9/1994 |
| JP | 2001044534 | | 2/2001 |
| JP | 2008004773 | | 1/2008 |

OTHER PUBLICATIONS

Japanese Office Action mailed Aug. 25, 2015 for Japanese Application No. 2014-077303.

* cited by examiner

*Primary Examiner* — Xinning Niu
(74) *Attorney, Agent, or Firm* — RatnerPrestia

(57) ABSTRACT

A laser gas estimation device includes a laser oscillator including a ventilator which circulates a laser gas, a discharge tube, a ventilator power unit which supplies power to the ventilator, and a discharge tube power unit which supplies power to the discharge tube, a detection unit which detects gas pressure of the laser gas, ventilator voltage applied to the ventilator, ventilator current supplied to the ventilator, discharge tube voltage applied to the discharge tube, and discharge tube current supplied to the discharge tube, and a composition ratio estimation unit which estimates the composition ratio of the laser gas based on a detected value detected by the detection unit.

6 Claims, 4 Drawing Sheets

| COMPOSITION RATIO OF LASER GAS CARBON DIOXIDE GAS : NITROGEN : HELIUM | LASER GAS PRESSURE | CURRENT VALUE OF HIGH FREQUENCY DISCHARGE POWER UNIT | | | |
|---|---|---|---|---|---|
| | | AT THE TIME OF DISCHARGE LIGHTING | OUTPUT COMMAND 0W | OUTPUT COMMAND 1000W | OUTPUT COMMAND 2000W |
| 5:25:70 | 12kPa | 500A | 800A | 1000A | 1200A |
| 5:55:40 | 10kPa | 400A | 700A | 900A | 1150A |

CARBON DIOXIDE GAS LASER OSCILLATOR WHICH CAN ESTIMATE COMPOSITION RATIO OF LASER GAS

BACKGROUND OF THE INVENTION

1. Field of the Invention

The present invention relates to a carbon dioxide gas laser oscillator which can estimate the composition ratio of a laser gas.

2. Description of Related Art

In general, laser gas which is used for a carbon dioxide gas laser oscillator is mainly composed of carbon dioxide gas, nitrogen gas, and helium gas. A laser gas obtained by mixing these gases at a predetermined composition ratio is provided to a laser oscillator. An apparatus is known in which, for supplying such laser gas, a gas flow channel for supplying a carbon dioxide gas, a gas flow channel for supplying a nitrogen gas, and a gas flow channel for supplying a helium gas are provided, and a laser gas having a predetermined composition ratio is generated in a laser gas mixing vessel by opening and closing the valve of each gas flow channel (see, for example, Japanese Laid-Open Patent Application No. 6-244478).

However, as is the case with the device described in the above-mentioned Japanese Laid-Open Patent Application No. 6-244478, even when a laser gas having a predetermined composition ratio is generated in a laser gas mixing vessel, the composition ratio of laser gas circulating in a laser oscillator changes, and therefore in some cases it is difficult to operate the laser oscillator. In such cases, the composition ratio of laser gas needs to be obtained by using a gas component analyzer or the like, and it is not easy to obtain the composition ratio by using such a component analyzer.

SUMMARY OF INVENTION

According to one aspect of the present invention, provided is a laser gas estimation device which estimates a composition ratio of laser gas mainly composed of one or a plurality of carbon dioxide gas, nitrogen gas, and helium gas, including a laser oscillator in which the laser gas is enclosed and which has a ventilator which circulates the laser gas, a discharge tube, a ventilator power unit which supplies power to the ventilator, and a discharge tube power unit which supplies power to the discharge tube, a detection unit which detects at least one of gas pressure of the laser gas enclosed in the laser oscillator, a ventilator voltage applied to the ventilator, a ventilator current supplied to the ventilator, a discharge tube voltage applied to the discharge tube, and a discharge tube current supplied to the discharge tube, and a composition ratio estimation unit which estimates the composition ratio of the laser gas based on a detected value detected by the detection unit.

BRIEF DESCRIPTION OF THE DRAWINGS

The foregoing and other objects, features, and advantages of the invention will be more apparent from the following description of preferred embodiments taken in conjunction with the accompanying drawings in which.

DETAILED DESCRIPTION OF THE INVENTION

First Embodiment

Figure 1:
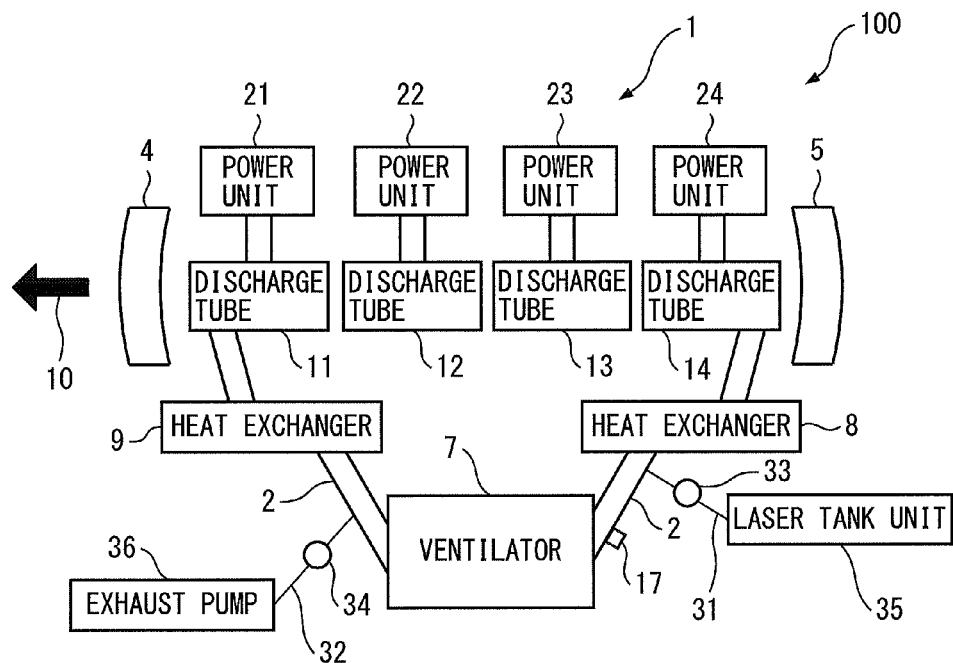
FIG. 1 is a schematic diagram illustrating a configuration of a laser gas estimation device according to a first embodiment of the present invention.

A first embodiment of the present invention will be described with reference to FIGS. 1 to 4. FIG. 1 is a schematic diagram illustrating a laser gas estimation device according to a first embodiment of the present invention, mainly representing the configuration of a carbon dioxide gas laser oscillator 1.

As illustrated in FIG. 1, the laser oscillator 1 includes a gas flow channel 2 in which a laser gas circulates, discharge tubes 11 to 14 which are provided on the gas flow channel 2, an output mirror 4 and a rear mirror 5 which are arranged to sandwich the discharge tubes 11 to 14, power units 21 to 24 which supply power to each of the discharge tubes 11 to 14, a ventilator 7 which circulates a laser gas along the gas flow channel 2, and heat exchangers 8 and 9 which are arranged on the upstream side and on the downstream side of the ventilator 7, respectively.

The gas flow channel 2 is formed by a laser gas vessel. A laser gas having a predetermined composition ratio is enclosed in the laser gas vessel isolated from the atmosphere. The gas flow channel 2 is provided with a pressure gauge 17 as a detection unit, and the pressure gauge 17 detects the laser gas pressure in the laser oscillator 1. When laser light is generated by the laser oscillator 1, the pressure (laser gas pressure) of the laser gas is controlled to a pressure (for example, about 10 kPa) close to vacuum, whereby the laser gas vessel constitutes a sealed vacuum vessel.

Power units 21 to 24 are high frequency power sources, and the discharge tubes 11 to 14 discharge at a high frequency by a power supplied from the power units 21 to 24. In this case, when the laser gas passes through the discharge tubes 11 to 14, the laser gas is excited to be in an excited state. A light generated by the discharge tubes 11 to 14 is amplified between the output mirror 4 and the rear mirror 5, and a part of the amplified light is output from the output mirror 4 as a laser light 10. The laser light 10 is supplied to an unillustrated laser beam machine. The laser beam machine is, for example, a machine for cutting sheet metal, in which a target sheet metal is irradiated with a laser light 10 supplied from the laser oscillator 1 to be cut.

The ventilator 7 is constituted by a fan or a blower which is driven by an electric motor. A power is supplied from a power unit 25 (FIG. 2) to the ventilator 7 via a ventilator inverter, which is not illustrated, and the ventilator 7 is rotated by the power to make the laser gas circulate along the gas flow channel 2. A predetermined refrigerant (for example, cooling water) is allowed to flow in the heat exchangers 8 and 9. The laser gas is cooled by heat exchange with the refrigerant when passing through the heat exchangers 8 and 9, and is maintained at a predetermined temperature.

A feed flow channel 31 and an exhaust flow channel 32 are connected to the gas flow channel 2. The feed flow channel 31 and the exhaust flow channel 32 are provided with a feed valve 33 and an exhaust valve 34, respectively, whose valve opening degree can be adjusted. The feed flow channel 31 is connected to a high pressure tank unit 35 in which laser gas is stored, and laser gas is supplied from the tank unit 35 to the gas flow channel 2 by opening or closing the feed valve 33. The exhaust flow channel 32 is connected to an exhaust pump 36, and laser gas is exhausted from the gas flow channel 2 by driving the exhaust pump 36. During laser oscillation, laser gas is supplied to or exhausted from the gas flow channel 2 via the feed flow channel 31 and exhaust flow channel 32, whereby a small amount of laser gas in the laser gas vessel is replaced.

A laser gas supplied to the laser oscillator 1 is mainly composed of carbon dioxide gas, nitrogen gas and a helium gas, and laser gas obtained by mixing these gases in a predetermined composition ratio is purchased from a gas supplier. However, the composition ratio of laser gas is not necessarily a predetermined composition ratio, and may be separated from a designated composition ratio. When such laser gas is supplied to the laser oscillator 1 to start the laser oscillator 1, the laser oscillator 1 is stopped with alarming due to discrepancy in the impedance of high frequency discharge, which makes it difficult to perform laser machining in some cases. To address such problems, the composition ratio of an actual laser gas needs to be obtained; however, it is not easy to obtain the composition ratio by using a component analyzer or the like. Accordingly, in the present embodiment, the composition ratio of a laser gas is estimated as follows.

Figure 2:
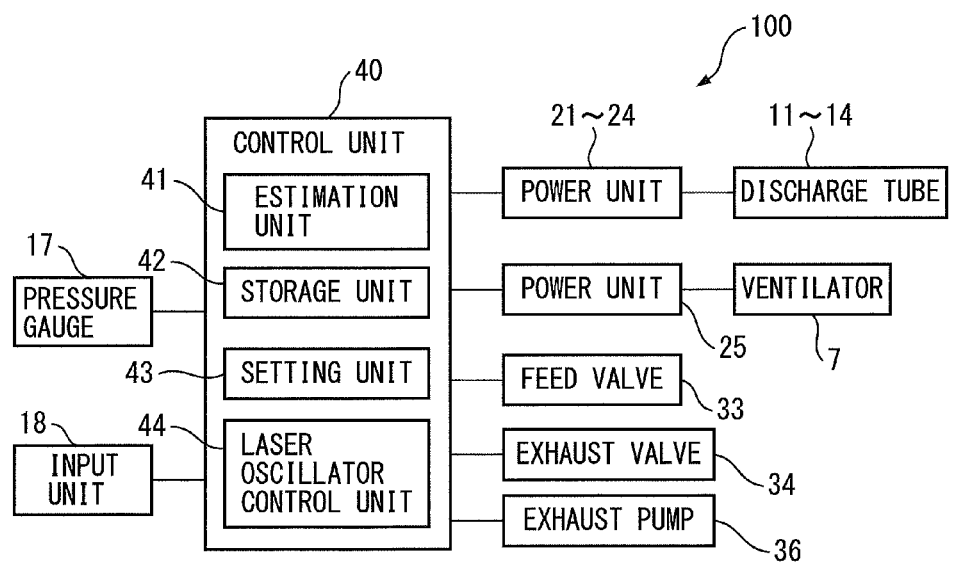
FIG. 2 is a block diagram illustrating a control configuration of a laser gas estimation device according to a first embodiment of the present invention.

FIG. 2 is a block diagram illustrating a control configuration of a laser gas estimation device 100 according to a first embodiment of the present invention. Signals from a pressure gauge 17 and an input unit 18 in which a user inputs a variety of commands such as start of laser oscillation or start of maintenance are input to a control unit 40. The control unit 40 is constituted by including an arithmetic processing unit including a CPU, a ROM, a RAM, and other peripheral circuits, and includes, as functional constituents, an estimation unit 41, a storage unit 42, a setting unit 43 and a laser oscillator control unit 44. The control unit 40 outputs a control signal to each of power units 21 to 24 for a discharge tube, a power unit 25 for ventilator, a feed valve 33, an exhaust valve 34, and an exhaust pump 36.

The estimation unit 41 estimates the composition ratio of laser gas based on a laser gas pressure P which has been detected by the pressure gauge 17. Let the composition ratios (volume ratio) of carbon dioxide gas, nitrogen gas, and helium gas which are main components of the laser gas be X1, X2, and X3, respectively. Since the laser gas does not contain other components, or contains a small amount of other components if any, the following Formula (I) is satisfied.

$$X1(\%)+X2(\%)+X3(\%)=100(\%) \quad \text{(I)}$$

Figures 3, 4:
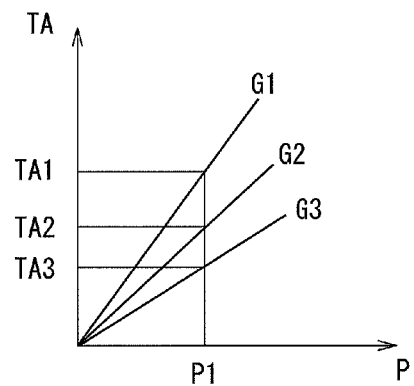
FIG. 3 is a graph illustrating one example of characteristic representing the relationship between a gas pressure and a ventilator current stored in a storage unit of FIG. 2.
FIG. 4 is a table representing the relationship among the composition ratio of laser gas, the target gas pressure, and the target discharge tube current set in the setting unit of FIG. 2.

In the storage unit 42, relationships between the gas pressure P and a current (ventilator current) flowing in the ventilator 7 for each component of the laser gas are stored in advance. FIG. 3 is one example of characteristic representing the relationship between the gas pressure P and a ventilator current TA stored in the storage unit 42. In the figure, characteristic G1 is characteristic of a carbon dioxide gas, characteristic G2 is characteristic of a nitrogen gas, and characteristic G3 is characteristic of a helium gas. As the gas pressure P increases, a load acting on the ventilator 7 increases. Accordingly, as illustrated in FIG. 3, for any of the characteristics G1, G2, and G3, as the gas pressure P increases, the ventilator current TA increases. Carbon dioxide gas, nitrogen gas, and helium gas each have different specific gravities, carbon dioxide gas is the heaviest, and helium gas is the lightest. Therefore, by comparing them under the condition in the same gas pressure P1, ventilator current TA1 of carbon dioxide gas is the largest, and ventilator current TA3 of helium gas is the smallest.

The ventilator current TA is a function using the gas pressure P as a parameter. For example, when a gas pressure detected by the pressure gauge 17 is P1, ventilator currents TA1, TA2, and TA3 corresponding to respective gas components can be derived from characteristics G1, G2, and G3 of FIG. 3 stored in advance. Letting the ventilator current flowing in the ventilator 7 be TA0, the following formula (II) is satisfied.

$$TA1 \times X1 + TA2 \times X2 + TA3 \times X3 = TA0 \quad \text{(II)}$$

Although not illustrated in figures, the storage unit 42 also stores in advance, for each component of the laser gas, the relationship between the gas pressure P and a voltage TV (ventilator voltage) applied to the ventilator 7, the relationship between the gas pressure P and a current RA (discharge tube current) supplied to the discharge tubes 11 to 14, and the relationship between the gas pressure P and a voltage RV (discharge tube voltage) applied to the discharge tube 11 to 14. In a similar manner to FIG. 3, these relationships are represented by the characteristic for each gas component, and when a gas pressure P is determined, a ventilator voltage TV, a discharge tube current RA, and a discharge tube voltage RV are determined for each gas component.

When the gas pressure detected by the pressure gauge 17 is P1, letting ventilator voltages corresponding to the gas components (carbon dioxide gas, nitrogen gas, and helium gas) determined by the characteristics stored in the storage unit 42 be TV1, TV2, and TV3, respectively, and letting the ventilator voltage applied to the ventilator 7 be TV0, the following formula (III) is satisfied.

$$TV1 \times X1 + TV2 \times X2 + TV3 \times X3 = TV0 \quad \text{(III)}$$

When the gas pressure detected by the pressure gauge 17 is P1, letting discharge tube currents corresponding to each gas component determined by characteristic stored in storage unit 42 be RA1, RA2, and RA3, and a discharge tube current supplied to discharge tube 11 to 14 be RA0, the following formula (IV) is satisfied.

$$RA1 \times X1 + RA2 \times X2 + RA3 \times X3 = RA0 \quad \text{(IV)}$$

Further, when the gas pressure detected by the pressure gauge 17 is P1, letting discharge tube voltages corresponding to gas components determined by the characteristics stored in the storage unit 42 be RV1, RV2, and RV3, and a discharge tube voltage applied to discharge tubes 11 to 14 be RV0, the following formula (V) is satisfied.

$$RV1 \times X1 + RV2 \times X2 + RV3 \times X3 = RV0 \quad \text{(V)}$$

To the ventilator 7, a current is supplied and a voltage is applied via a power unit 25 by a command from a control unit 40, and to discharge tubes 11 to 14, a current is supplied and a voltage is applied via power units 21 to 24 by a command from the control unit 40. The control unit 40 thus functions as a detection unit which can detect a ventilator current TA0, a ventilator voltage TV0, a discharge tube current RA0, and a discharge tube voltage RV0. Therefore, unknown numbers in the above-mentioned formulae (I) to (V) are X1, X2, and X3. An estimation unit 41 calculates composition ratios X1, X2, and X3 by solving the above formulae (I) to (V) simultaneously. It should be noted that since there are three unknown numbers, not all of the above-mentioned formulae (I) to (V) need to be used for calculating the composition ratios X1, X2, and X3. When all of the above-mentioned formulae (I) to (V) are used, a plurality of sets of the composition ratios are obtained. The plurality of sets of the composition ratios are averaged, and one set of composition ratios X1, X2, and X3 are eventually determined.

In the above, composition ratios are estimated by using formulae with respect to the ventilator current TA, the ventilator voltage TV, the discharge tube current RA, and the discharge tube voltage RV, which use the composition ratios X1, X2, and X3 as parameters and which are a function of the gas pressure P. In contrast, relationships of the composition ratio of the laser gas with respect to the gas pressure P, the ventilator voltage PV, the ventilator current PA, the discharge tube voltage RV, and the discharge tube current RA may be stored in the storage unit 42 in advance, and the estimation unit 41 may estimate the composition ratio using these relationships. For example, the ventilator current TA, the ventilator voltage TV, the discharge tube current RA, and the discharge tube voltage RV corresponding to a plurality of combinations of composition ratios in which the composition ratios are changed by 5% with the gas pressure P being fixed may be stored in the storage unit 42.

A setting unit 43 sets a target gas pressure Pa of a laser gas which can operate the laser oscillator 1 and a target discharge tube current RAa corresponding to an output command of the laser oscillator 1, in accordance with the composition ratio of the laser gas which has been estimated by the estimation unit 41. For example, relationships between the composition ratio, the target gas pressure Pa, and the target discharge tube current RAa as illustrated in FIG. 4 are stored in the storage unit 42 in advance, and the target gas pressure Pa and the target discharge tube current RAa corresponding to the composition ratio are set by using the relationships. In FIG. 4, target discharge tube currents RAa at the time of discharge lighting, at the time of output command of 0 W, at the time of output command of 1000 W, and at the time of output command of 2000 W are stored. Therefore, the target discharge tube current RAa is set in accordance with a laser output command.

A laser oscillator control unit 44 outputs a control signal to power units 21 to 25 in accordance with the target gas pressure Pa and the target discharge tube current RAa set by the setting unit 43. In other words, a control signal is output to the power unit 25 such that the laser gas pressure P in the laser oscillator 1 detected by the pressure gauge 17 is a target gas pressure Pa to control the rotation of the ventilator 7, and at the same time, a control signal is output to the power units 21 to 24 such that the target discharge tube current RAa flows in the discharge tubes 11 to 14. The laser oscillator control unit 44 may control power units 21 to 25, as well as a feed valve 33, an exhaust valve 34, and an exhaust pump 36 simultaneously.

In this way, in the setting unit 43, the target gas pressure Pa and the target discharge tube current RAa which can operate the laser oscillator 1 are set in accordance with the estimated composition ratio, and in the laser oscillator control unit 44, the gas pressure P and the discharge tube current RA are controlled to the target gas pressure Pa and the target discharge tube current RAa, respectively. Accordingly, even when the composition ratio of laser gas is different from a predetermined composition ratio (composition ratio specified to a supplier), a stable high frequency discharge can be maintained, thereby continuing laser machining efficiently. In other words, when the composition ratio is different from a predetermined composition ratio, it is difficult to perform high frequency discharge if laser gas pressure P or discharge tube current RA is not changed. However, in the present embodiment, a stable high frequency discharge can be performed and laser machining can also be performed continuously since laser gas pressure P and a discharge tube current RA are automatically set according to the estimated composition.

According to the first embodiment, the following effect can be attained.

(1) A laser oscillator 1 includes a ventilator 7 which circulates a laser gas, discharge tubes 11 to 14, power unit 25 which supplies power to the ventilator 7, and power units 21 to 24 which supply power to the discharge tubes 11 to 14. A laser gas estimation device 100 includes a pressure gauge 17 which detects a gas pressure P of a laser gas enclosed in the laser oscillator 1, and an estimation unit 41 which estimates the composition ratio of the laser gas based on the gas pressure P detected by the pressure gauge 17. According to this manner, the composition ratio of a laser gas can be easily comprehended without using gas component analysis or the like. Therefore, when the composition ratio is deviated from a predetermined composition ratio, a quick response is possible.

(2) The estimation unit 41 computes the composition ratio corresponding to a detected gas pressure P by using equations (the above-mentioned formulae (II) to (V)) with respect to a ventilator voltage TV, a ventilator current TA, a discharge tube voltage RV, and a discharge tube current RA which use the composition ratio of a laser gas as a parameter and which are a function of a gas pressure P. By adopting this configuration, the composition ratio of a laser gas thus can be easily estimated.

(3) Relationships of a gas pressure P, a ventilator voltage TV, a ventilator current TA, a discharge tube voltage RV, and a discharge tube current RA with respect to the composition ratio of a laser gas are stored in a storage unit 42 in advance, and the estimation unit 41 can estimate the composition ratio corresponding to the detected gas pressure P by using the stored relationships. By adopting this configuration, the composition ratio of the laser gas can thus be precisely estimated.

(4) The laser gas estimation device 100 further includes a setting unit 43 which sets, in accordance with the composition ratio of a laser gas estimated in the estimation unit 41, a target gas pressure Pa of the laser gas which can operate the laser oscillator 1 and a target discharge tube current RAa corresponding to an output command of the laser oscillator 1, and a laser oscillator control unit 44 which controls power units 21 to 25 in accordance with a set target gas pressure Pa and a set target discharge tube current RAa. According to this manner, even when the composition ratio of laser gas is deviated from a designated composition ratio, the laser gas pressure P and the discharge tube current RA are automatically set to optimum values, and laser oscillation can stably be performed, thereby performing laser machining efficiently.

Second Embodiment

Figure 5:
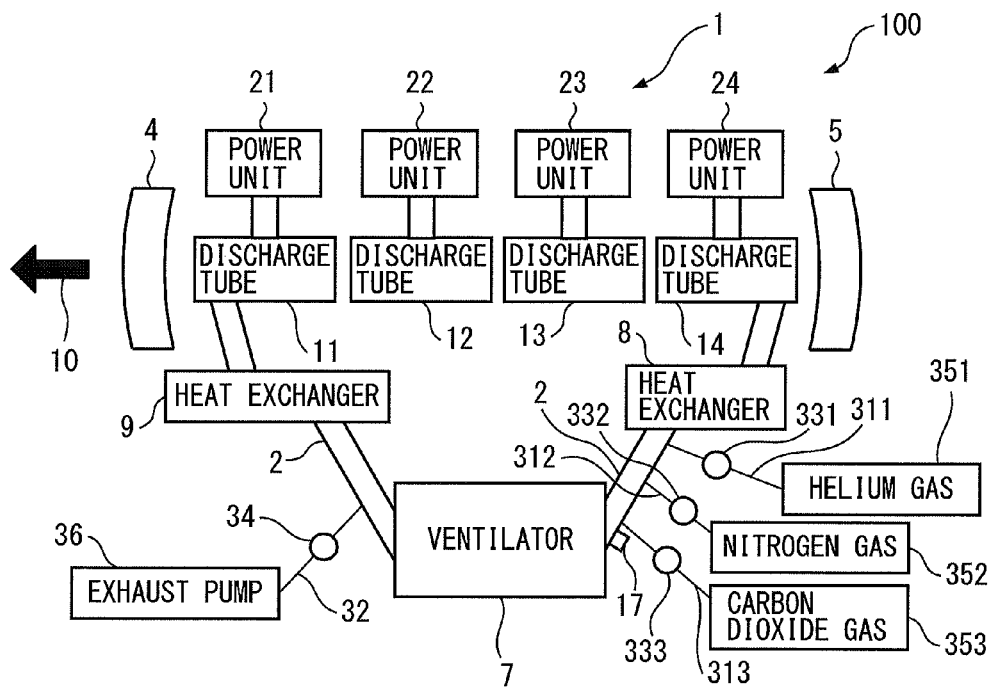
FIG. 5 is a schematic diagram illustrating the configuration of a laser gas estimation device according to a second embodiment of the present invention.
Figure 6:
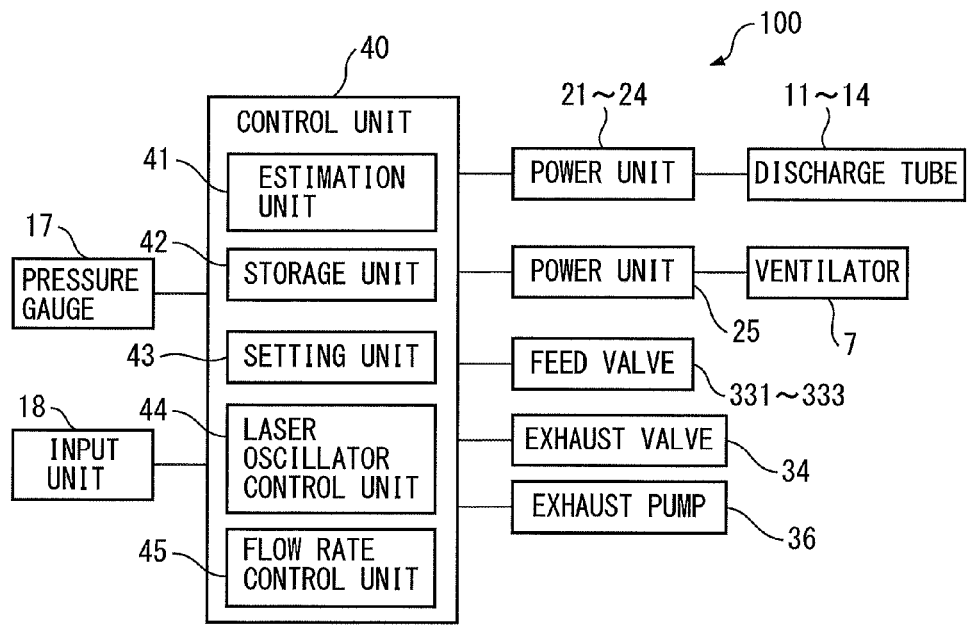
FIG. 6 is a block diagram illustrating a control configuration of the laser gas estimation device according to the second embodiment of the present invention.

A second embodiment of the present invention will be described with reference to FIGS. 5 to 7. FIG. 5 is a schematic configuration of laser gas estimation device 100 according to the second embodiment of the present invention, and FIG. 6 is a block diagram illustrating a control configuration of the laser gas estimation device 100. The same reference signs are given to the same elements as in FIGS. 1 and 2, and the following description will be mainly made with regard to the difference from the first embodiment.

As illustrated in FIG. 5, to the gas flow channel 2, a tank unit 351 in which a helium gas is stored is connected via a flow channel 311 as a helium gas supply path. To the gas flow channel 2, a tank unit 352 in which a nitrogen gas is stored is connected via a flow channel 312 as a nitrogen gas supply path. To the gas flow channel 2, a tank unit 353 in which a carbon dioxide gas is stored is connected via a flow channel 313 as a carbon dioxide gas supply path. On the flow channels 311 to 313, feed valves 331 to 333 whose valve opening degree can be adjusted are provided. The feed valve 331 functions as a helium gas adjustment unit which adjusts the amount of a helium gas supplied via the flow channel 311. The feed valve 332 functions as a nitrogen gas adjustment unit which adjust the amount of a nitrogen gas supplied via the flow channel 312. The feed valve 333 functions as a carbon dioxide gas adjustment unit which adjusts the amount of a carbon dioxide gas supplied via the flow channel 313. The helium gas, nitrogen gas, and carbon dioxide gas can be each independently supplied to the flow channel 2 via the feed valves 331 to 333. According to this manner, the composition ratio of a laser gas can be adjusted. Since, by employing the configuration of FIG. 5, a mixture gas of helium gas, nitrogen gas, and carbon dioxide gas is generated at the laser oscillator 1, there is no need to prepare a gas mixer separately to generate a mixture gas. The configuration of the laser gas estimation device 100 can thus be made simple.

As illustrated in FIG. 6, the control unit 40 includes an estimation unit 41, a storage unit 42, a setting unit 43, and a laser oscillator control unit 44, and further includes a flow rate control unit 45. The flow rate control unit 45 outputs a control signal to feed valves 331 to 333, an exhaust valve 34 and an exhaust pump 36, and when, during laser oscillation, the composition ratio estimated at the estimation unit 41 is different from a predetermined composition ratio (target composition ratio), the flow rate control unit corrects the difference. For example, when the estimated composition ratio of helium gas is larger than a target composition ratio and the estimated composition ratio of nitrogen gas is smaller than a target composition ratio, the valve opening degree of the feed valve 332 is increased (for example, fully open) and the valve opening degree of the feed valve 331 is decreased (for example, fully closed).

When the gas pressure P detected by the pressure gauge 17 is larger than a predetermined target gas pressure at the time of laser oscillation, the valve opening degree of the exhaust valve 34 is increased (for example, fully open) and at the same time the exhaust pump 36 is driven to adjust the gas pressure P to a target gas pressure. On the contrary, when the gas pressure P is smaller than a predetermined target gas pressure, the valve opening degree of the exhaust valve 34 is decreased (for example, fully closed) and the gas pressure P is adjusted to a target gas pressure.

When the exhaust valve 34 is fully closed, drive of the exhaust pump 36 is stopped, and at the same time, the valve opening degrees of the feed valves 331 to 333 are simultaneously increased while the ratio of the valve opening degrees of the feed valves 331 to 333 is maintained constant. For example, when the ratio of the valve opening degrees of the feed valves 331 to 333 is 1:1:1, three valve opening degrees are simultaneously increased while maintaining 1:1:1. When the ratio of the valve opening degrees of the feed valves is 1:2:1, three valve opening degrees are simultaneously increased while maintaining 1:2:1. As mentioned above, the composition ratio of a laser gas can be adjusted to a target composition ratio during laser oscillation, and at the same time the gas pressure P can be adjusted to a target gas pressure. Therefore, when the composition ratio is different from a target composition ratio, the composition ratio is corrected to the target composition ratio, whereby the laser oscillator 1 can perform a favorable laser oscillation.

When, for example, a command for starting maintenance is input by an input unit 18, a flow rate control unit 45 increases the gas pressure in the laser oscillator 1 to an atmospheric pressure. In this case, the flow rate control unit 45 opens the feed valve 332 and closes the feed valves 331 and 333. Only a nitrogen gas is thus supplied to the gas flow channel 2. As mentioned above, by supplying only an inexpensive nitrogen gas to the gas flow channel 2 when the laser oscillator 1 is not operated, for example, during maintenance, running cost can be reduced. Since an outside air is not introduced to the gas flow channel 2 at the time of maintenance, inclusion of water or dirt in a laser gas vessel can be prevented.

Figure 7:
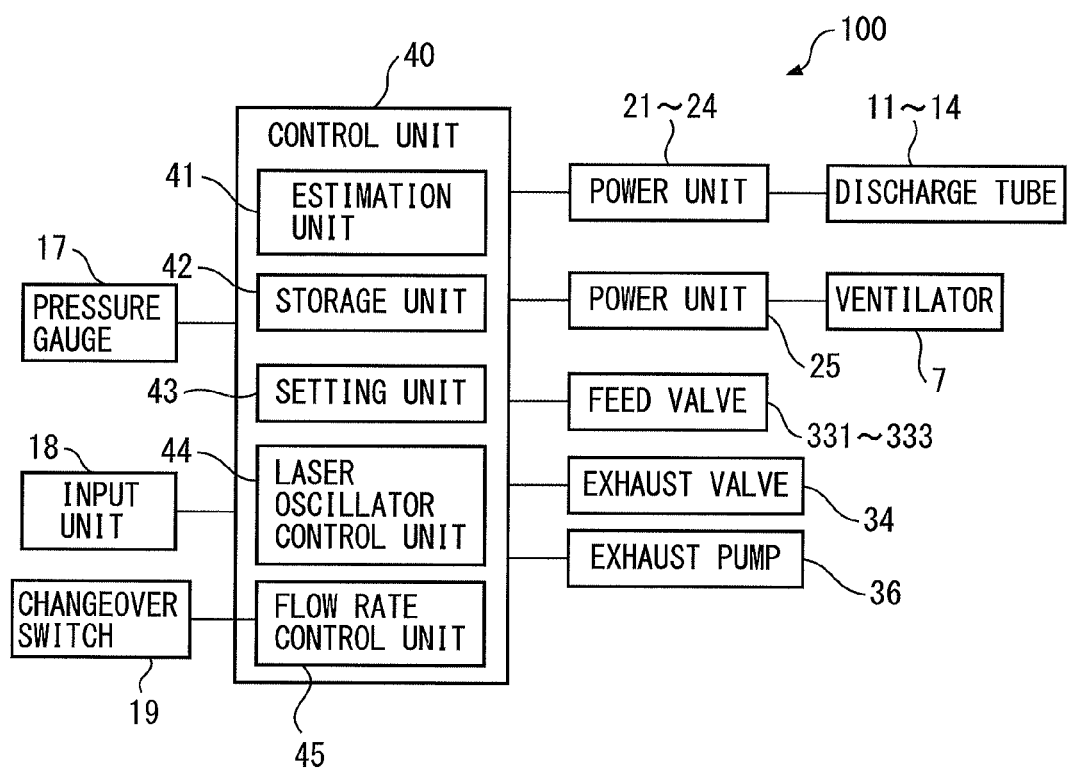
FIG. 7 is a diagram illustrating a modified example of the laser gas estimation device of FIG. 6.

FIG. 7 is a diagram illustrating a modified example of FIG. 6. As illustrated in FIG. 7, to the control unit 40, a changeover switch 19 which is optionally operated by a user as well as a pressure gauge 17 and an input unit 18 is connected. The changeover switch 19 is a switch which commands a target composition ratio of a laser gas, and can switch to three positions which includes a normal position, a quality priority position, and a cost priority position. The changeover switch 19 functions as a command unit which commands a target composition ratio of a laser gas. The normal position is selected when a normal laser machining is performed. In this case, a target composition ratio of a laser gas is set, for example, to carbon dioxide gas:nitrogen gas:helium gas=5:55:40.

The quality priority position is selected when the quality of a cut surface of laser machining is prioritized. Since a high concentration of a helium gas makes a cut surface smooth, a target composition ratio in this case is, for example, set to carbon dioxide gas:nitrogen gas:helium gas=5:25:70. On the other hand, the cost priority position is selected when cost is prioritized. A helium gas is more expensive than a carbon dioxide gas or a nitrogen gas, and when the concentration of a helium gas is low, the cost can be reduced. Therefore, the target composition ratio in this case is set, for example, to carbon dioxide gas:nitrogen gas:helium gas=5:65:30. By making the composition ratio selectable by the changeover switch 19 in such a manner, machining which meets a user's demand can be performed easily.

Although, in the above-mentioned embodiments, the composition ratio of a laser gas including a carbon dioxide gas, nitrogen gas, and helium gas as main components is estimated, the composition ratio of laser gas including at least one of the carbon dioxide gas, nitrogen gas, and helium gas as main components can be estimated in a similar manner. Although, in the above-mentioned embodiments, the gas pressure P of laser gas enclosed in the laser oscillator 1 is detected by the pressure gauge 17, and at the same time, the control unit 40 itself detects a ventilator voltage PV applied to the ventilator 7, a ventilator current PA supplied to the ventilator 7, a discharge tube voltage RV applied to the discharge tubes 11 to 14, and a discharge tube current RA supplied to the discharge tubes 11 to 14, the configuration of the detection unit is not limited thereto. The detection unit may be a detection unit which detects at least one of a gas pressure P, ventilator voltage PV, ventilator current PA, discharge tube voltage RV and discharge tube current RA.

Although, in the above-mentioned embodiment, the estimation unit 41 computes the composition ratio corresponding to a detected value by using equations (II) to (V) with respect to a ventilator voltage PV, ventilator current PA, discharge tube voltage RV, and discharge tube current RA which use the composition ratio of a laser gas as a parameter and which are a function of the gas pressure P, the composition ratio can be computed by using any one of the equations. Although, in the above-mentioned embodiment, relationships of a gas pressure P, ventilator voltage PV, ventilator current PA, discharge tube voltage RV, and discharge tube current RA with respect to the composition ratio of a laser gas are stored in the storage unit 42 in advance and the estimation unit 41 estimates a composition ratio corresponding to a detected value by using the stored relationships, a relationship between at least one of the gas pressure P, ventilator voltage PV, ventilator current PA, discharge tube voltage RV, and discharge tube current RA with respect to the composition ratio of a laser gas is stored in advance and the composition ratio can be estimated by using the relationship. In other words, when the composition ratio of a laser gas is estimated based on a detected value (for example, a gas pressure P) detected by a detection unit, the configuration of the estimation unit 41 as a composition ratio estimation unit may be any configuration.

Although, in the above-mentioned embodiment, the setting unit 43 sets a target gas pressure Pa of a laser gas which can operate the laser oscillator 1 and a target discharge tube current RAa corresponding to an output command of the laser oscillator 1, in accordance with the composition ratio of the laser gas which has been estimated by the estimation unit 41, and in the laser oscillator control unit 44, the power unit 25 (a ventilator power unit) and the power units 21 to 24 (discharge tube power units) are controlled, the configurations of the setting unit and the laser oscillator control unit are not limited thereto.

Although, in the above-mentioned embodiment (FIG. 5), the laser gas estimation device 100 includes flow channels 311 to 313 (a helium gas supply path, nitrogen gas supply path, and carbon dioxide gas supply path) which supply helium gas, nitrogen gas, carbon dioxide gas, respectively to the laser oscillator 1, and feed valves 331 to 333 (a helium gas adjustment unit, a nitrogen gas adjustment unit, and a carbon dioxide gas adjustment unit) which adjust the amounts of a helium gas, nitrogen gas, and carbon dioxide gas which are supplied via flow channels 311 to 313, respectively, and controls feed valves 331 to 333 such that the composition ratio of a laser gas in the laser oscillator 1 is a predetermined composition ratio (a target composition ratio) in accordance with a composition ratio estimated by the estimation unit 41, the configuration of the flow rate control unit is not limited thereto.

Although, in the above-mentioned embodiment, in cases in which the gas pressure P in the laser oscillator 1 is increased to a predetermined pressure when the laser oscillator 1 is not operated, for example, during maintenance, the feed valves 331 to 333 are controlled such that only nitrogen gas is supplied in the laser oscillator 1, other gases may be supplied. Although in the above-mentioned embodiment (FIG. 7), a target composition ratio can be selected by a user by the operation of the changeover switch 19, the configuration of a command unit which commands a target composition ratio of laser gas is not limited thereto. For example, a user may directly input the value of a target composition ratio. In this case, the configuration of a flow rate control unit is not limited to those mentioned above as long as the feed valves 331 to 333 are controlled such that the composition ratio of laser gas in the laser oscillator 1 is a target composition ratio commanded by a command unit in accordance with a composition ratio estimated by the estimation unit 41.

Although, in the above-mentioned embodiment, the laser oscillator 1 which encloses the laser gas and includes the ventilator 7 which circulates the laser gas, the discharge tubes 11 to 14, the power unit 25 (a ventilator power unit) which supplies power to the ventilator 7, and power units 21 to 24 (discharge tube power units) which supply power to the discharge tubes 11 to 14, the configuration of the laser oscillator is not limited thereto. The number of discharge tubes or discharge tube power units may be other than four (for example, two). Although, in the above-mentioned embodiment, a laser light generated in the laser oscillator 1 is used for laser machining, the laser light may be used for other applications.

According to the present invention, at least one of the gas pressure of laser gas, ventilator voltage, ventilator current, discharge tube voltage, and discharge tube current is detected, and the composition ratio of the laser gas is estimated based on the detected value, and therefore, the composition ratio can be easily comprehended without using a gas component analyzer.

The above description is strictly for illustration purposes, and the present invention is not limited to the above-mentioned embodiments and modified examples as long as the features of the present invention are not compromised. Components of the above-mentioned embodiment and modified examples include those which can be replaced and which are obviously replaced while maintaining identification of the invention. In other words, other embodiments which can be considered within the technical ideas of the present invention also fall within the scope of the present invention. The above-mentioned embodiment and at least one of the modified examples can be optionally combined.

The invention claimed is:

1. A laser gas estimation device which estimates a composition ratio of laser gas mainly composed of one or a plurality of carbon dioxide gas, nitrogen gas, and helium gas, the laser gas estimation device comprising:
    a laser oscillator enclosing the laser gas and comprising a ventilator which circulates the laser gas, a discharge tube, a ventilator power unit which supplies power to the ventilator, and a discharge tube power unit which supplies power to the discharge tube;
    a detection unit which detects at least one of a gas pressure of the laser gas enclosed in the laser oscillator, a ventilator voltage applied to the ventilator, a ventilator current supplied to the ventilator, a discharge tube voltage applied to the discharge tube, and a discharge tube current supplied to the discharge tube;
    a composition ratio estimation unit which estimates the composition ratio of the laser gas based on a detected value detected by the detection unit; and
    a storage unit which stores a relationship between at least one of the gas pressure, the ventilator voltage, the ventilator current, the discharge tube voltage, and the discharge tube current, and the composition ratio of the laser gas, wherein
    the composition ratio estimation unit estimates the composition ratio corresponding to the detected value using the relationship stored in the storage unit.

2. A laser gas estimation device which estimates a composition ratio of laser gas mainly composed of one or a plurality of carbon dioxide gas, nitrogen gas, and helium gas, the laser gas estimation device comprising:
    a laser oscillator enclosing the laser gas and comprising a ventilator which circulates the laser gas, a discharge tube, a ventilator power unit which supplies power to the ventilator, and a discharge tube power unit which supplies power to the discharge tube;
    a detection unit which detects at least one of a pas pressure of the laser gas enclosed in the laser oscillator, a ventilator voltage applied to the ventilator, a ventilator current supplied to the ventilator, a discharge tube voltage applied to the discharge tube, and a discharge tube current supplied to the discharge tube; and a composition ratio estimation unit which estimates the composition ratio of the laser gas based on a detected value detected by the detection unit;

wherein the composition ratio estimation unit computes the composition ratio corresponding to the detected value by using an equation with respect to at least one of the ventilator voltage, the ventilator current, the discharge tube voltage, and the discharge tube current which uses the composition ratio of the laser gas as a parameter and which is a function of the gas pressure.

3. The laser gas estimation device according to claim 1, further comprising:

a setting unit which sets a target gas pressure of the laser gas which can operate the laser oscillator and a target discharge tube current corresponding to an output command of the laser oscillator in accordance with the composition ratio of the laser gas estimated in the composition ratio estimation unit; and a laser oscillator control unit which controls the ventilator power unit and the discharge tube power unit in accordance with the target gas pressure and the target discharge tube current set by the setting unit.

4. The laser gas estimation device according to claim 1, further comprising:

a carbon dioxide gas supply path which supplies carbon dioxide gas to the laser oscillator;

a nitrogen gas supply path which supplies nitrogen gas to the laser oscillator;

a helium gas supply path which supplies helium gas to the laser oscillator;

a carbon dioxide gas adjustment unit which adjusts an amount of carbon dioxide gas supplied via the carbon dioxide gas supply path;

a nitrogen gas adjustment unit which adjusts an amount of nitrogen gas supplied via the nitrogen gas supply path;

a helium gas adjustment unit which adjusts an amount of helium gas supplied via the helium gas supply path; and a flow rate control unit which controls the carbon dioxide gas adjustment unit, the nitrogen gas adjustment unit, and the helium gas adjustment unit such that the composition ratio of the laser gas in the laser oscillator is a predetermined composition ratio in accordance with the composition ratio estimated by the composition ratio estimation unit.

5. A laser gas estimation device which estimates a composition ratio of laser gas mainly composed of one or a plurality of carbon dioxide gas, nitrogen gas, and helium gas, the laser gas estimation device comprising:

a laser oscillator enclosing the laser gas and comprising a ventilator which circulates the laser gas, a discharge tube, a ventilator power unit which supplies power to the ventilator, and a discharge tube power unit which supplies power to the discharge tube;

a detection unit which detects at least one of a gas pressure of the laser gas enclosed in the laser oscillator, a ventilator voltage applied to the ventilator, a ventilator current supplied to the ventilator, a discharge tube voltage applied to the discharge tube, and a discharge tube current supplied to the discharge tube;

a composition ratio estimation unit which estimates the composition ratio of the laser gas based on a detected value detected by the detection unit;

a carbon dioxide gas supply path which supplies carbon dioxide gas to the laser oscillator;

a nitrogen gas supply path which supplies nitrogen gas to the laser oscillator;

a helium gas supply path which supplies helium gas to the laser oscillator;

a carbon dioxide gas adjustment unit which adjusts an amount of carbon dioxide gas supplied via the carbon dioxide gas supply path;

a nitrogen gas adjustment unit which adjusts an amount of nitrogen gas supplied via the nitrogen gas supply path;

a helium gas adjustment unit which adjusts an amount of helium gas supplied via the helium gas supply path; and a flow rate control unit which controls the carbon dioxide gas adjustment unit, the nitrogen gas adjustment unit, and the helium gas adjustment unit such that the composition ratio of the laser gas in the laser oscillator is a predetermined composition ratio in accordance with the composition ratio estimated by the composition ratio estimation unit;

wherein the flow rate control unit controls the carbon dioxide gas adjustment unit, the nitrogen gas adjustment unit, and the helium gas adjustment unit such that only nitrogen gas is supplied to the laser oscillator in cases in which gas pressure in the laser oscillator is increased to a predetermined pressure when the laser oscillator is not operated.

6. The laser gas estimation device according to claim 4, further comprising a command unit which commands a target composition ratio of the laser gas, wherein the flow rate control unit controls the carbon dioxide gas adjustment unit, the nitrogen gas adjustment unit, and the helium gas adjustment unit such that the composition ratio of the laser gas in the laser oscillator is the target composition ratio commanded by the command unit in accordance with the composition ratio estimated by the composition ratio estimation unit.

* * * * *